(12) United States Patent
Ohtsuki et al.

(10) Patent No.: US 10,597,308 B2
(45) Date of Patent: Mar. 24, 2020

(54) WATER TREATMENT PLANT CONTROLLING METHOD AND CONTROLLING PROGRAM, AND WATER TREATMENT SYSTEM

(71) Applicant: KURITA WATER INDUSTRIES LTD., Tokyo (JP)

(72) Inventors: Takayuki Ohtsuki, Tokyo (JP); Yuuya Sasaki, Tokyo (JP); Hiroshi Iizuka, Tokyo (JP); Yoshimasa Nakano, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 214 days.

(21) Appl. No.: 15/039,205

(22) PCT Filed: Nov. 25, 2013

(86) PCT No.: PCT/JP2013/081633
§ 371 (c)(1),
(2) Date: May 25, 2016

(87) PCT Pub. No.: WO2015/075835
PCT Pub. Date: May 28, 2015

(65) Prior Publication Data
US 2016/0362305 A1 Dec. 15, 2016

(51) Int. Cl.
*C02F 1/44* (2006.01)
*B01D 61/12* (2006.01)
(Continued)

(52) U.S. Cl.
CPC .......... *C02F 1/008* (2013.01); *B01D 61/025* (2013.01); *B01D 61/04* (2013.01); *B01D 61/12* (2013.01);
(Continued)

(58) Field of Classification Search
CPC .. C02F 1/008; C02F 1/283; C02F 1/68; C02F 1/685; C02F 1/686; C02F 1/72;
(Continued)

(56) References Cited

U.S. PATENT DOCUMENTS 5,242,602 A * 9/1993 Richardson ............ G01N 21/31
  210/143
6,076,048 A * 6/2000 Gunther ................ F22B 37/421
  702/45
(Continued)

FOREIGN PATENT DOCUMENTS

JP 2004-275826 A 10/2004
JP 2005-199127 A 7/2005
(Continued)

OTHER PUBLICATIONS

Victoria G. Christensen et al, Regression Analysis and Real-Time Water-Quality Monitoring to Estimate Constituent Concentrations, Loads, and Yields in the Little Arkansas River, South-Central Kansas, 1995-1999, Water-Resources Investigations Report 00-4126. Lawrence, Kansas, (Year: 2000).*
(Continued)

*Primary Examiner* — Joseph W Drodge
(74) *Attorney, Agent, or Firm* — Knobbe, Martens, Olson & Bear LLP (57) ABSTRACT

A water treatment plant controlling method including: determining whether or not there is a correlation, in water to be treated, between a water quality index and a concentration of a pollution component having no causal relationship with the water quality index, from a result of sample analysis of the water to be treated performed periodically; and (a) under a condition that there is a correlation, statistically analyzing a distribution of measurement values of the water quality index in a previous certain period of the water to be treated, and based on a result of the statistical analysis and the
(Continued)

correlation, estimating the concentration of the pollution component of the water to be treated; and determining an operating condition of a water treatment plant for treating the water to be treated, based on the estimated concentration of the pollution component of the water to be treated; or (b) on a condition that a correlation is absent, statistically analyzing a distribution of concentration of the pollution component in all past sample analyses of the water to be treated, and based on a result of the statistical analysis, estimating the concentration of the pollution component of the water to be treated.

8 Claims, 3 Drawing Sheets

(51) Int. Cl.
B01D 61/02 (2006.01)
B01D 61/04 (2006.01)
G05B 13/02 (2006.01)
C02F 1/00 (2006.01)

(52) U.S. Cl.
CPC .......... C02F 1/441 (2013.01); G05B 13/0205 (2013.01); B01D 2311/04 (2013.01); B01D 2311/103 (2013.01); B01D 2311/243 (2013.01); C02F 2209/001 (2013.01); C02F 2209/003 (2013.01); C02F 2209/006 (2013.01); C02F 2209/02 (2013.01); C02F 2209/04 (2013.01); C02F 2209/05 (2013.01); C02F 2209/08 (2013.01); C02F 2209/16 (2013.01); C02F 2209/20 (2013.01); C02F 2209/30 (2013.01); C02F 2209/40 (2013.01); C02F 2303/22 (2013.01)

(58) Field of Classification Search
CPC .......... C02F 2209/001; C02F 2209/003; C02F 2209/005; C02F 2209/006; C02F 2209/06; C02F 2209/11; C02F 2209/36; C02F 2209/40; C02F 2209/44; C02F 2209/445; C02F 1/441; C02F 2209/30; C02F 2209/04; C02F 2209/08; C02F 2209/16; C02F 2209/02; C02F 2209/20; C02F 2303/22; C02F 2209/05; C02F 2209/00; G06F 19/00; G06F 17/40; G01N 33/18; G01N 33/1813; G01N 33/182; G01N 33/1826; G01N 1/10; G01N 2001/1087; G01N 2001/1093; G01N 33/1853; G05B 13/02; G05B 13/021; G05B 13/024; G05B 13/0255; G05B 13/026; G05B 13/0205; G05B 13/00; G05B 13/0265; G05B 13/04; G05B 13/048; G05B 19/00; G05B 19/02; G05B 21/00; G05B 21/02; B01D 61/025; B01D 61/12; B01D 17/12; B01D 61/02; B01D 61/04; B01D 2311/04; B01D 2311/103; B01D 2311/16; B01D 2311/246; G06G 7/48; G06G 7/56; G06Q 10/0637; G06Q 50/00; G06Q 50/06
USPC ... 210/85, 87, 94, 96.1, 96.2, 103, 143, 149, 210/198.1, 739, 749, 752, 758, 764; 702/25, 50, 55, 108; 73/61.41, 61.59, 73/863.01, 863.23; 700/266, 273; 703/2, 703/9; 706/21, 903, 911, 916, 928, 930
See application file for complete search history.

(56) References Cited

U.S. PATENT DOCUMENTS

| | | | | |
|---|---|---|---|---|
| 6,408,227 | B1* | 6/2002 | Singhvi | C02F 1/008 700/266 |
| 6,535,795 | B1* | 3/2003 | Schroeder | G05B 13/029 210/143 |
| 6,697,767 | B2* | 2/2004 | Wang | G05B 11/42 702/179 |
| 6,845,336 | B2* | 1/2005 | Kodukula | C02F 1/008 700/48 |
| 7,404,899 | B2* | 7/2008 | Rosen | A01G 25/00 210/652 |
| 7,720,615 | B2* | 5/2010 | Kim | G01N 33/1846 435/29 |
| 9,856,154 | B2* | 1/2018 | Horikawa | C02F 1/441 |
| 2004/0104157 | A1* | 6/2004 | Beeman | B01D 61/04 210/232 |
| 2004/0173528 | A1* | 9/2004 | Herrington | B01D 61/04 210/637 |
| 2005/0016906 | A1* | 1/2005 | Gettman | B01D 17/0202 210/143 |
| 2007/0119782 | A1* | 5/2007 | Rawson | B01D 61/025 210/650 |
| 2007/0295650 | A1* | 12/2007 | Yoneda | B01D 61/025 210/97 |
| 2008/0046127 | A1* | 2/2008 | Piironen | C02F 1/008 700/271 |
| 2008/0109175 | A1* | 5/2008 | Michalak | C02F 1/008 702/50 |
| 2008/0255814 | A1* | 10/2008 | Chia | G05B 13/048 703/6 |
| 2008/0314807 | A1* | 12/2008 | Junghanns | B01D 61/025 210/85 |
| 2009/0236649 | A1* | 9/2009 | Huang | H01L 23/5223 257/307 |
| 2010/0204924 | A1* | 8/2010 | Wolfe | C02F 1/008 702/25 |
| 2010/0332149 | A1* | 12/2010 | Scholpp | C02F 1/008 702/25 |
| 2011/0035195 | A1* | 2/2011 | Subbiah | B01D 61/12 703/2 |
| 2011/0119110 | A1* | 5/2011 | Lin | G06Q 30/0202 705/7.31 |
| 2011/0166367 | A1* | 7/2011 | Gross | B01J 8/067 549/247 |
| 2011/0190917 | A1* | 8/2011 | Moyne | G06F 19/00 700/103 |
| 2012/0298569 | A1* | 11/2012 | Volker | B01D 61/025 210/198.1 |
| 2013/0015137 | A1* | 1/2013 | Urmenyi | B01D 37/04 210/654 |
| 2013/0126430 | A1* | 5/2013 | Kenley | B01D 61/00 210/638 |
| 2013/0335731 | A1* | 12/2013 | Jorden | G01N 15/0227 356/73 |
| 2014/0048462 | A1* | 2/2014 | Cohen | B01D 61/22 210/96.2 |
| 2014/0094975 | A1* | 4/2014 | Nielsen | C02F 1/004 700/282 |
| 2015/0362471 | A1* | 12/2015 | Kano | G01N 33/18 356/440 |
| 2017/0121200 | A1* | 5/2017 | Brozell | C02F 9/00 |
| 2017/0187592 | A1* | 6/2017 | Ghosh | H04L 41/145 |
| 2017/0203979 | A1* | 7/2017 | Tarquin | C02F 1/441 |

FOREIGN PATENT DOCUMENTS

| | | |
|---|---|---|
| JP | 2008-055354 A | 3/2008 |
| JP | 2013-034987 A | 2/2013 |
| JP | 2014-004550 A | 1/2014 |

(56) References Cited

OTHER PUBLICATIONS

Spyros K. Golfinopoulos et al., "Multiple regression models: A methodology for evaluating trihalomethane concentrations in drinking water from raw water characteristics", published in Chemosphere, vol. 47, 2002, pp. 1007-1018. (Year: 2002).*
Vassilis Antonopoulos et al, "Statistical and trend analysis of water quality and quantity data fro the Strymon River in Greece", published in Hydrology and Earth System Sciences, vol. 5(4), pp. 679-691. (Year: 2001).*
"Data Analysis Protocol for the Ground Water Monitoring and Assessment Program", Published by Minnesota Pollution Control Agency, St. Paul, Minnesota, Mar. 1999, pp. 1-44. (Year: 1999).*
International Search Report dated Feb. 25, 2014, for International Application No. PCT/JP2013/081633.

\* cited by examiner

WATER TREATMENT PLANT CONTROLLING METHOD AND CONTROLLING PROGRAM, AND WATER TREATMENT SYSTEM

INCORPORATION BY REFERENCE TO ANY PRIORITY APPLICATIONS

This application is the U.S. National Phase of International Application No. PCT/JP2013/081633, filed Nov. 25, 2013, designating the U.S. Any and all applications for which a foreign or domestic priority claim is identified here or in the Application Data Sheet as filed with the present application are hereby incorporated by reference under 37 CFR 1.57.

FIELD OF THE INVENTION

The present invention relates to a water treatment plant controlling method, a water treatment plant controlling program, and a water treatment system.

BACKGROUND OF THE INVENTION

As an example of a conventional technology for managing a water treatment plant, there is a publicly known plant management system in which in a management center connected with a water treatment plant via a communication line, the operating state of the water treatment plant is monitored and the operating state is evaluated, and operating conditions are changed based on the evaluation result (see Patent Document 1, for example). In such a plant management system of a water treatment plant, evaluation of the operating state of the water treatment plant is performed based on the measurement values by the sensors provided to the water treatment plant, for example.

In general, as sensors provided to a water treatment plant, typical industrial instrument is used. Specifically, low-cost sensors such as a conductivity meter for measuring conductivity of the water to be treated, a turbidity meter for measuring turbidity of the water to be treated, an absorptiometer for measuring absorbance of the water to be treated, a pH meter for measuring potential Hydrogen (pH) of the water to be treated, and an oxidation-reduction potentiometer for measuring oxidation-reduction potential (ORP) of the water to be treated, are used generally.

PRIOR ART DOCUMENT

Patent Document

Patent Document 1: Japanese Patent No. 3624940

SUMMARY OF THE INVENTION

Problems to be Solved by the Invention

With the above-described typical industrial instrument (conductivity meter, turbidity meter, absorptiometer, pH meter, oxidation-reduction potentiometer, and the like), it is impossible to directly measure concentration of pollution components (inorganics such as silica and calcium, for example) having no causal relationship with the water quality indexes (conductivity, turbidity, absorbance, pH, oxidation-reduction potential, and the like) to be measured, among the pollution components adversely affecting the operation of the water treatment plant. As measurement devices capable of directly measuring such pollution components are quite costly in general, it is likely to be difficult to provide such devices to a water treatment plant in practice due to financial restrictions or the like. As such, measurement of such pollution components as described above is performed manually by an operator, who collects and analyzes samples of the water to be treated periodically.

However, the frequency of collection and analysis of samples of the water to be treated, performed manually by an operator, is about only once a week or once a month for example, considering the labor, the time, and the like required for the work. As such, it is difficult to accurately grasp variation in the quality of the water to be treated only with the analysis results of the water to be treated from which the samples are collected. For example, when the quality of the water to be treated varied in a short period of time, an abnormality may occur in the water treatment plant due to a delay in responding to it.

The present invention has been made in view of such a situation. An object of the present invention is to enable a water treatment plant to be operated under the optimum operating conditions precisely corresponding to the variation in the quality of water to be treated, without any costly measurement devices.

Means for Solving the Problems

When there is no causal relationship between a water quality index of the water to be treated and concentration of a pollution component, it is impossible to directly estimate the concentration of the pollution component from the water quality index, theoretically. However, in the case of water to be treated in which the generation source is fixed and the component variation is small such as service water including industrial water, clean water, well water, pure water produced by treating such water, cooling water produced through a process of simply condensing such water, boiler water, and RO concentrated water, it is often the case where a ratio between components contained in the water to be treated is almost constant. This also applies to the case of wastewater of a plant where single kind of mass is produced such as food, beverage, steel, paper pulp, or the like. Further, as for general wastewater, wastewater of a main manufacturing process system, and the like of a plant where a plurality of processes are operated simultaneously such as a semiconductor manufacturing plant, a liquid-crystal panel manufacturing plant, and a chemical complex, it is often the case where the property of the wastewater is almost stable and the component ratio thereof is almost constant.

When a component ratio of components contained in the water to be treated is almost constant, it is assumed that a ratio between a component having a causal relationship with a water quality index and a component having no causal relationship with the water quality index is almost constant. As such, when a component ratio in the water to be treated is almost constant, via a causal relationship between a water quality index and a component, a certain correlation can be established between the water quality index and another component having no causal relationship with the water quality index. This means that there is a case where a component ratio in the water to be treated is almost constant depending on the generation source and the generation process of the water to be treated, and in that case, a certain correlation can be established between a water quality index and a pollution component having no causal relationship with the water quality index. The present invention has been made based on such knowledge.

The present invention is a water treatment plant controlling method including a correlation determination step of determining whether or not there is a correlation, in the water to be treated, between a water quality index and concentration of a pollution component having no causal relationship with the water quality index, from a result of sample analysis of the water to be treated performed periodically; a first pollution component concentration estimation step of, under the condition that there is the correlation, statistically analyzing distribution of the measurement values of the water quality index in a previous certain period of the water to be treated, and based on the result of the statistical analysis and the correlation, estimating the concentration of the pollution component of the water to be treated; and an operating condition determination step of determining an operating condition of the water treatment plant for treating the water to be treated, based on the estimated concentration of the pollution component of the water to be treated.

First, from a result of sample analysis of the water to be treated performed periodically, it is determined whether or not there is a correlation between a water quality index and a concentration of pollution component having no causal relationship with the water quality index. Then, on the condition that there is a correlation between the two, statistical analysis is performed on the distribution of the measurement values of the water quality index in a previous certain period of the water to be treated, and based on the result of the statistical analysis and the correlation, concentration of the pollution component is estimated. Thereby, from a water quality index, it is possible to estimate concentration of a pollution component having no causal relationship with the water quality index with high accuracy. As such, variation in the water quality of the water to be treated can be grasped precisely without any costly measurement devices. Then, based on the estimated concentration of the pollution component, operating conditions of the water treatment plant in which the water to be treated are determined. Thereby, the water treatment plant can be operated with the optimum operating conditions precisely corresponding to the variation in the water quality of the water to be treated.

With this configuration, according to the present invention, it is possible to achieve an effect of operating the water treatment plant with the optimum operating conditions precisely corresponding to the variation in the water quality of the water to be treated, without any costly measurement devices.

DETAILED DESCRIPTION OF THE INVENTION

Hereinafter, embodiments of the present invention will be described with reference to the drawings.

<Configuration of Water Treatment Apparatus>

As an example of a "water treatment plant", a configuration of a water treatment apparatus 10 will be described with reference to FIG. 1.

Figure 1:
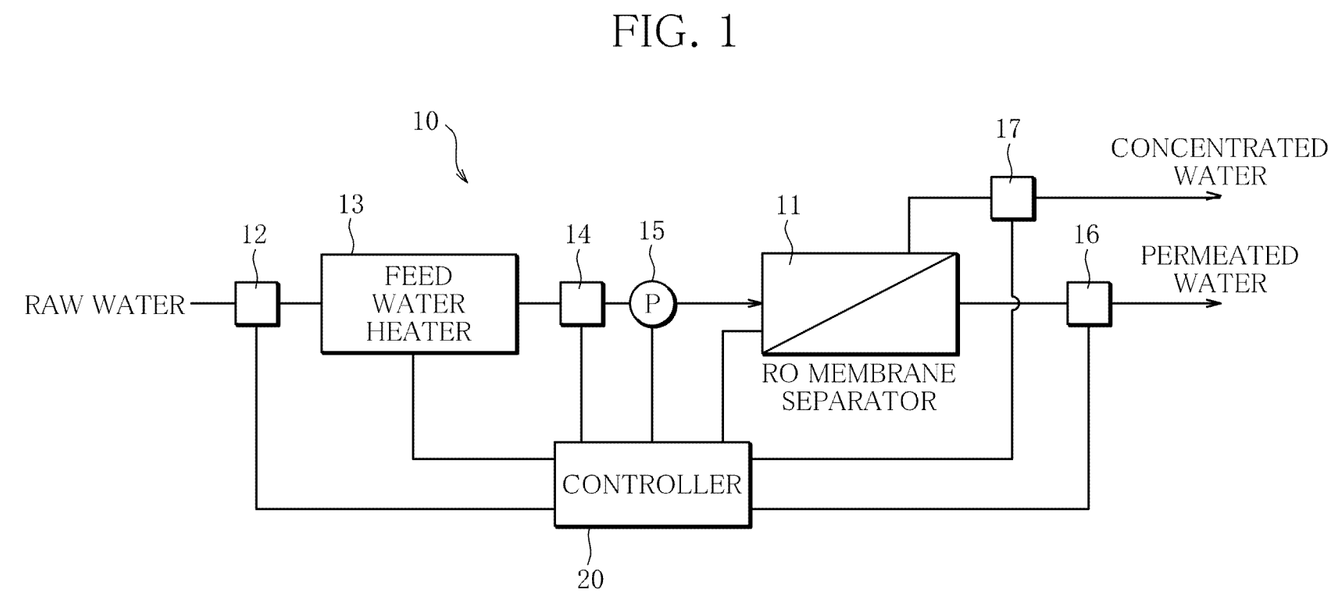
FIG. 1 is a block diagram showing a configuration of a water treatment apparatus.

FIG. 1 is a block diagram showing a configuration of the water treatment apparatus 10.

The water treatment apparatus 10 includes a reverse osmosis (RO) membrane separator 11, a conductivity sensor 12, a feed water heater 13, a temperature sensor 14, a high pressure pump 15, a first flow sensor 16, a second flow sensor 17, and a controller 20.

The RO membrane separator 11 is a water filter using an RO membrane having a characteristic of transmitting water but not transmitting impurities other than water. In this example, while an RO membrane means a reverse osmosis membrane, it also includes a so-called nano-filtration membrane. The water to be treated, supplied to the RO membrane separator 11, is separated into permeated water which permeated through the RO membrane, and concentrated water which did not permeate the RO membrane and was concentrated.

The conductivity sensor 12, as a "measuring device", is provided to a flow passage for supplying water to be treated to the RO membrane separator 11 (hereinafter referred to as a "water to be treated supplying path"), and is a sensor for measuring conductivity of the water to be treated. The feed water heater 13 is provided to the water to be treated supplying path, and is a device for adjusting temperature of the water to be treated to be supplied to the RO membrane separator 11. The temperature sensor 14 is provided downstream of the feed water heater 13 in the water to be treated supplying path, and is a sensor that detects temperature of the water to be treated output from the feed water heater 13. The high pressure pump 15 is provided to the water to be treated supplying path, and is a pump that pressurizes the water to be treated and sends it to the RO membrane separator 11. The first flow sensor 16 is provided to a flow passage through which the permeated water is discharged from the RO membrane separator 11, and is a sensor that detects a flow rate of the permeated water discharged from the RO membrane separator 11. The second flow sensor 17 is provided to a flow passage through which the concentrated water is discharged from the RO membrane separator 11, and is a sensor that detects a flow rate of the concentrated water discharged from the RO membrane separator 11. The controller 20 is a publicly known microcomputer controller which controls the RO membrane separator 11, the feed water heater 13, and the high pressure pump 15, based on output signals from the conductivity sensor 12, the temperature sensor 14, the first flow sensor 16, and the second flow sensor 17.

<Control of Water Treatment Apparatus>

The controller 20 controls the feed water heater 13 based on an output signal from the temperature sensor 14 so as to allow the temperature of the water to be treated, to be supplied to the RO membrane separator 11, to be a desired temperature. The controller 20 also controls the RO membrane separator 11 and the high pressure pump 15 based on output signals from the first flow sensor 16 and the second flow sensor 17 so as to allow a water recovery ratio of the RO membrane separator 11 to be a desired water recovery ratio. Then, the controller 20 sets the temperature of the water to be treated to be supplied to the RO membrane separator 11 and the water recovery ratio of the RO membrane separator 11, to the optimum values, based on the conductivity of the water to be treated detected by the conductivity sensor 12. Measurement of the conductivity of the water to be treated by the conductivity sensor 12 is performed repeatedly at a constant frequency, and the entire data of the conductivity measurement values is stored and accumulated in a storage device (not shown) of the controller 20.

Meanwhile, the water recovery ratio of the RO membrane separator 11 varies depending on the pressure of supplying the water to be treated by the high pressure pump 15, or the temperature of the water to be treated to be supplied. From the viewpoint of water saving, it is desirable to set the water recovery ratio of the RO membrane separator 11 as high as possible, while suppressing a risk that scale is formed (hereinafter referred to as a "scale formation risk") in the RO membrane separator 11 to be in a certain allowable range.

However, as the water recovery ratio of the RO membrane separator 11 increases, the scale formation risk also increases along with it. Further, the scale formation risk in the RO membrane separator 11 is also affected by the temperature of the supplied water to be treated. For example, regarding calcium-based scale forming components, the formation risk increases as the temperature of the water to be treated is higher, while regarding silica-based scale forming components, the formation risk increases as the temperature of the water to be treated is lower. This means that the temperature of the water to be treated, to be supplied to the RO membrane separator 11, is desirably maintained within a certain range, from the viewpoint of suppressing a scale formation risk. On the other hand, from the viewpoint of power saving, the temperature of the water to be treated, to be supplied to the RO membrane separator 11, is desirably as low as possible.

The scale formation risk in the RO membrane separator 11 also varies, depending on the concentration of the scale forming components (inorganic substances such as silica, calcium ion, magnesium ion, and hydrogen carbonate ion, for example) included in the water to be treated. In the case of silica concentration of the water to be treated, for example, as there is no causal relationship with the conductivity of the water to be treated, it cannot be estimated directly from the conductivity of the water to be treated, theoretically. However, there is a case where a component ratio in the water to be treated is almost constant, depending on the generation source or the generation process of the water to be treated, as described above. When a component ratio of components included in the water to be treated is almost constant, it is assumed that a ratio between a component having a causal relationship with the conductivity of the water to be treated and a scale forming component such as silica having no causal relationship with the conductivity of the water to be treated is almost constant.

Accordingly, when a component ratio in the water to be treated is almost constant, via a causal relationship between the conductivity of the water to be treated and a component, a certain correlation may be established between the conductivity of the water to be treated and a scale forming component such as silica. Specific examples of such water to be treated include industrial water, clear water, well water, and the like containing ionic components, organic pollutants such as organic acid, and inorganic ion such as chloride ion.

Hereinafter, a procedure of controlling the water treatment apparatus 10 will be described with reference to FIGS. 2 to 4.

Figure 2:
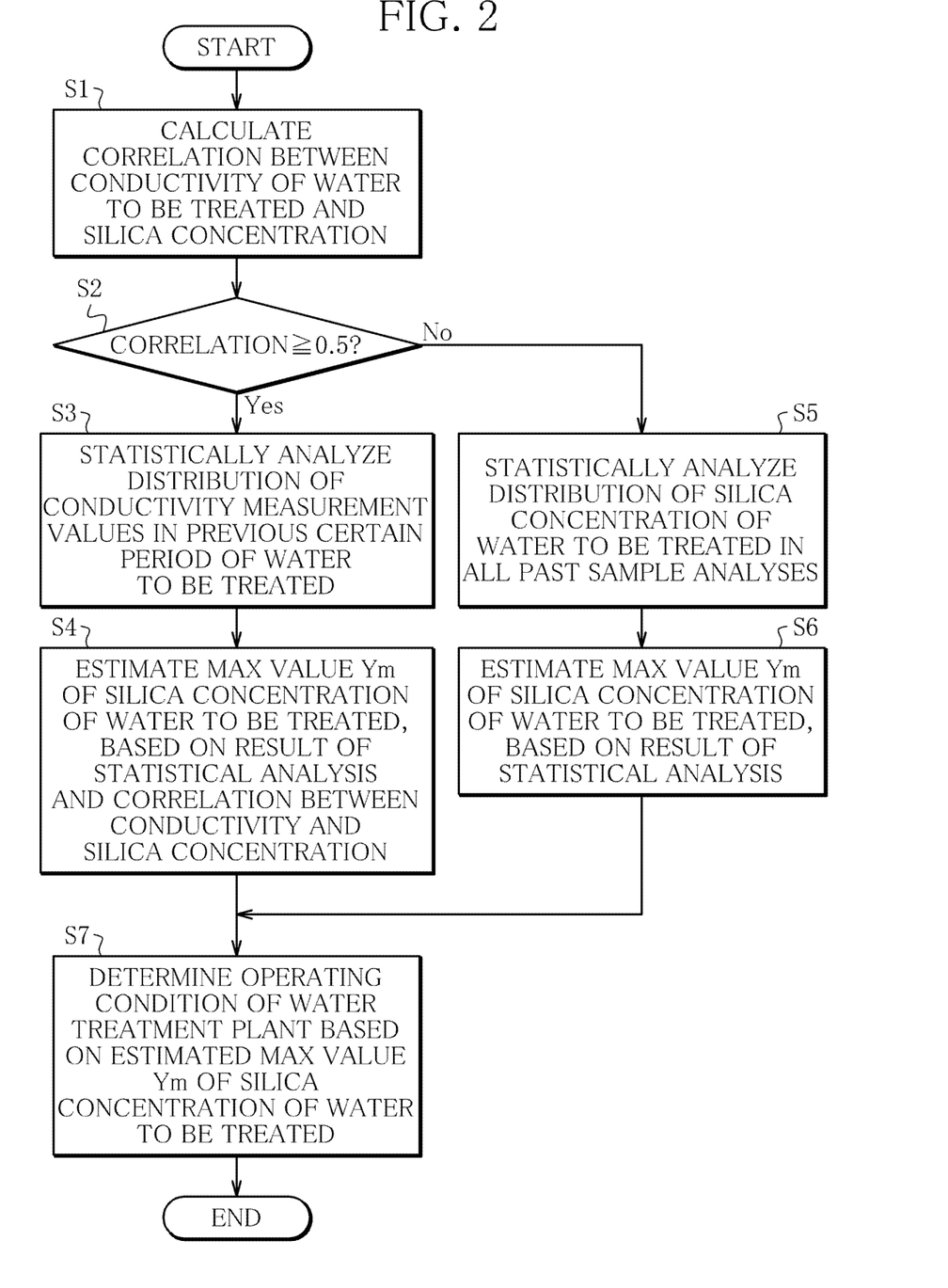
FIG. 2 is a flowchart showing a procedure of controlling the water treatment apparatus.

FIG. 2 is a flowchart showing a procedure of controlling the water treatment apparatus 10.

1. Correlation Determination Procedure

First, it is determined whether or not there is a correlation between the conductivity of the water to be treated and silica ($SiO_2$) concentration, from a result of sample analysis of water to be treated which is performed periodically. The sample analysis is performed such that an operator collects a sample of water to be treated every day or about once a week or a month, for example, and performs measurement of the conductivity of the collected sample and analysis of the silica concentration. Then, from the data of the sample analysis results accumulated in the predetermined number, the operator calculates a correlation coefficient between the conductivity of the water to be treated and the silica concentration, and determines whether or not there is a correlation between the two based on the correlation coefficient (step S1 in FIG. 2).

In general, it is said that there is a slight correlation if the absolute value of a correlation coefficient ranges from 0.2 to 0.4, that there is a considerable correlation if it ranges from 0.4 to 0.7, and that there is a strong correlation if it ranges from 0.7 to 1.0. In the present invention, the reference for determining presence or absence of a correlation may be determined appropriately based on the allowable level of a risk in the water treatment apparatus 10, for example. For example, in the present example, whether or not there is a correlation between the conductivity of the water to be treated and the silica concentration is determined based on whether or not the absolute value of the correlation coefficient is 0.5 or larger (step S2 in FIG. 2). Calculation of the correlation coefficient and determination of presence or absence of the correlation may be performed manually by an operator based on the data of sample analysis data, for example, to input the result to the controller 20, or may be performed such that the data of the sample analysis results is input to the controller 20 and arithmetic processing is performed by a program executed by a computer of the controller 20.

2. First Pollution Component Concentration Estimation Procedure

Figure 3:
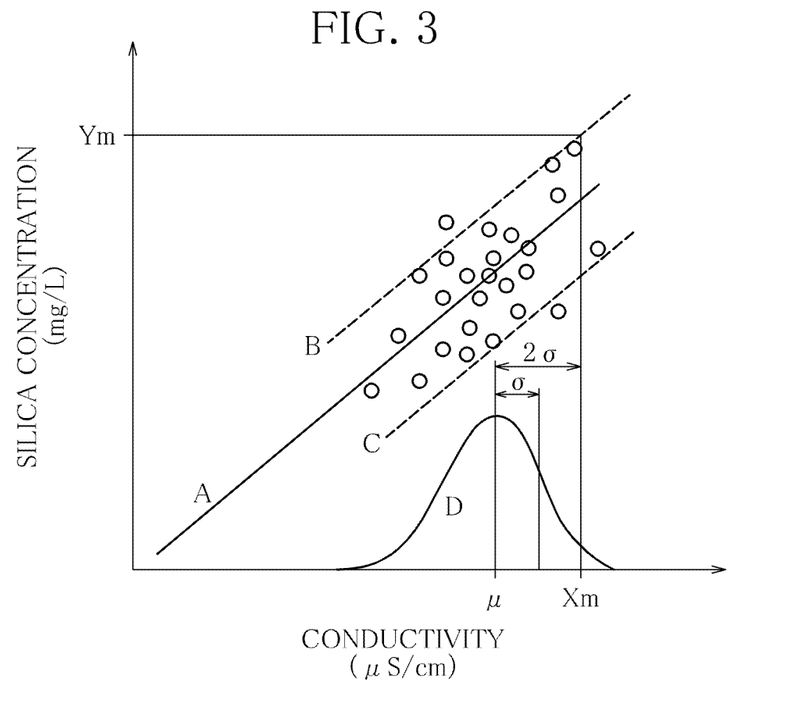
FIG. 3 is a scatter plot of sample analysis data of the conductivity of the water and silica concentration to be treated, and a frequency distribution chart of conductivity measurement values of the water to be treated in the previous month.

FIG. 3 is a scatter plot showing exemplary sample analysis data of the conductivity of the water and the silica concentration to be treated, and frequency distribution of the conductivity measurement values of the water to be treated in the previous month.

On the condition that the absolute value of the correlation coefficient between the conductivity of the water to be treated and the silica concentration is 0.5 or larger (Yes at step S2 of FIG. 2), distribution of the conductivity measurement values of the water to be treated (conductivity of the water to be treated measured by the conductivity sensor 12) in a previous certain period is analyzed statistically (step S3 of FIG. 2). Then, based on the result of the statistical analysis and the correlation between the conductivity of the water to be treated and the silica concentration, silica concentration of the water to be treated is estimated (step S4 of FIG. 2).

More specifically, first, regression analysis is performed on the results of the sample analysis of the water to be treated to obtain a regression line (solid line A in FIG. 3) and prediction limits (dashed lines B and C in FIG. 3) thereof. Then, an average value $\mu$ and a standard deviation $\sigma$ of the frequency distribution (a graph denoted by a reference character D in FIG. 3) of the conductivity measurement values of the water to be treated in the precedent month are calculated by statistical analysis, and a maximum value Xm of the conductivity measurement values, falling under the appearance probability set based on the average value $\mu$ and the standard deviation $\sigma$, is calculated. If the appearance probability is a probability that the conductivity measurement values are included in a range where deviation from the average value μ is 2σ, the appearance probability is about 95.44%. In that case, a risk that the actual conductivity of the water to be treated exceeds the maximum value Xm is about 4.56%. Then, based on the upper prediction limit B of the regression line A and the maximum value Xm of the conductivity measurement values, a maximum value (worst value) Ym of the silica concentration corresponding to the maximum value Xm of the conductivity measurement values of the water to be treated is calculated, which is used as estimated silica concentration of the water to be treated.

The procedures of regression analysis of the results of sample analysis of the water to be treated, statistical analysis of the frequency distribution of the conductivity measurement values of the water to be treated in the previous month, and calculation of the maximum value Ym of the silica concentration based on the regression analysis and the statistical analysis, as described above, may be performed manually by an operator, or performed through arithmetic processing by a program executed by a computer of the controller 20.

3. Second Pollution Component Concentration Estimation Procedure

For example, when any variation occurs temporarily in the generation source or the generation process of the water to be treated, variation may occur in the component ratio of the water to be treated, by which a correlation between the conductivity of the water to be treated and the silica concentration may not be established temporarily. In the case where a correlation is not established between the conductivity of the water to be treated and the silica concentration, it is difficult to estimate the silica concentration of the water to be treated according to the first pollution component concentration estimation procedure described above, that is, based on the conductivity of the water to be treated. In that case, on the condition that the absolute value of the correlation coefficient between the conductivity of the water to be treated and the silica concentration is less than 0.5 (No at step S2 in FIG. 2), for example, statistical analysis is performed provisionally on the distribution of the silica concentration of the water to be treated in all past sample analyses of the water to be treated (step S5 in FIG. 2). Then, based on the result of the statistical analysis, silica concentration of the water to be treated is estimated (step S6 in FIG. 2). This means that silica concentration of the water to be treated is estimated statistically based on the accumulated data of the silica concentration in the past sample analysis.

Figure 4:
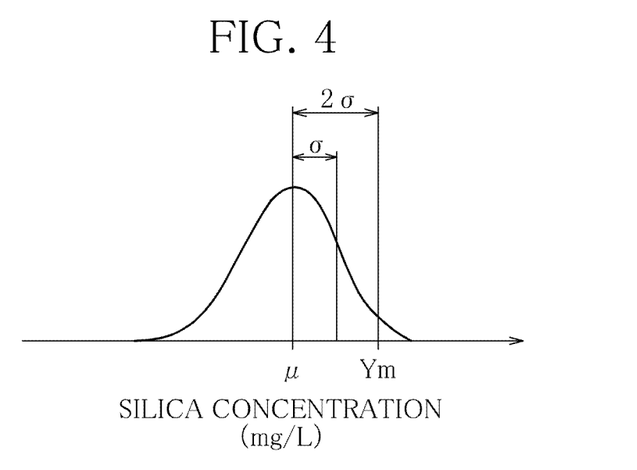
FIG. 4 is a frequency distribution chart of silica concentration in the entire sample analysis of the water to be treated in the past.

FIG. 4 is a graph showing frequency distribution of silica concentration of the water to be treated in all past sample analyses of the water to be treated.

More specifically, first, an average value μ and a standard deviation σ of the frequency distribution of silica concentration in all past sample analyses of the water to be treated are calculated by statistical analysis, and a maximum value Ym of the silica concentration, falling under the appearance probability set based on the average value μ and the standard deviation σ, is calculated. If the appearance probability is a probability that the silica concentration is included in a range where deviation from the average value μ is 2σ, for example, the appearance probability is about 95.44%. In that case, a risk that the actual silica concentration of the water to be treated exceeds the maximum value Ym is about 4.56%. Then, the maximum value Ym of the silica concentration is used as estimated silica concentration of the water to be treated.

The procedures of statistical analysis of the distribution of silica concentration of the water to be treated in all past sample analyses of the water to be treated, and calculation of the maximum value Ym of the silica concentration based on the statistical analysis, as described above, may be performed manually by an operator, or performed through arithmetic processing by a program executed by a computer of the controller 20.

4. Operating Condition Determination Procedure

Based on the silica concentration of the water to be treated estimated by either the first pollution component concentration estimation procedure or the second pollution component concentration estimation procedure described above, operating conditions of the water treatment apparatus 10 for processing the water to be treated are determined (step S7 in FIG. 2). More specifically, based on the maximum value Ym of the silica concentration of the water to be treated, a water recovery ratio of the RO membrane separator 11 is set, for example, and the temperature of the water to be treated to be supplied to the RO membrane separator 11 is set, for example. Setting of the water recovery ratio of the RO membrane separator 11 and setting of the temperature of the water to be treated to be supplied to the RO membrane separator 11 may be performed manually by an operator, or set automatically by a program executed by a computer of the controller 20.

5. Effects

According to the procedure of controlling the water treatment apparatus described above, from the conductivity of the water to be treated, silica concentration of the water to be treated having no causal relationship with the conductivity can be estimated with high accuracy. As such, it is possible to accurately grasp variation in the silica concentration of the water to be treated without any costly measurement devices. Then, by determining the water recovery ratio of the RO membrane separator 11 and the temperature of the water to be treated to be supplied to the RO membrane separator 11 based on the estimated silica concentration, it is possible to operate the water treatment apparatus 10 under the optimum operating conditions precisely corresponding to the variation in the silica concentration of the water to be treated, to thereby realize significant water saving.

Further, when a correlation is not established between the conductivity of the water to be treated and the silica concentration, it is preferable to statistically estimate silica concentration of the water to be treated based on the accumulated data of the past sample analysis, as described above. With this configuration, even if any variation occurs temporarily in the generation source or the generation process of the water to be treated for example so that a correlation between the conductivity of the water to be treated and the silica concentration is not established temporarily, it is possible to safely continue operation of the water treatment apparatus 10 by setting appropriate operating conditions. Further, as for the silica concentration of the water to be treated, it is preferable to calculate a maximum value (worst value) of the silica concentration of the water to be treated through statistical analysis and use it as estimated silica concentration of the water to be treated, as described above. Thereby, it is possible to operate the water treatment apparatus 10 more safely under the optimum operating conditions.

Other Examples and Modifications

The present invention is not limited to be the above-described embodiments, and it is needless to say that the present invention can be modified in various manners within the scope of the invention claimed in the claims. A storage medium storing a control program for a water treatment plant according to the present invention may also be a subject of the present invention.

For example, while the case of estimating silica concentration based on the conductivity of the water to be treated has been exemplary described in the embodiment given above, the present invention is not particularly limited to this. For example, it is also possible to estimate concentration of an inorganic substance other than silica, such as calcium (Ca), magnesium (Mg), or iron (Fe), for example. Further, it is also possible to estimate concentration of an organic pollutant, in which biochemical oxygen demand (BOD), chemical oxygen demand (COD), total organic carbon (TOC), or the like serves as an index, for example. Further, it is also possible to estimate concentration of a nitrogen pollutant such as ammonium nitrogen (NH4-N), nitrite nitrogen (NO2-N), or nitrate nitrogen (NO3-N), for example. Further, it is also possible to estimate a phosphorus pollutant such as phosphate-phosphorus (PO4-P) or total phosphorus (T-P), a chemical substance in the wastewater, such as a source material used in industrial production, for example.

Further, while the case of using the conductivity of the water to be treated as a water quality index has been exemplary described in the embodiment given above, the present invention is not particularly limited to this. For example, in the wastewater relating to paper pulp in which solid pollutants are contained, turbidity of the water to be treated may be used as a water quality index. Further, in the wastewater in general containing organic pollutants, inorganic or organic colored wastewater such as dye effluent, wastewater relating to paper pulp containing solid pollutants, and the like, for example, absorbance of the water to be treated may be used as a water quality index. Further, regarding the wastewater in general containing inorganic/organic acid/alkali pollutants, for example, potential Hydrogen (pH) of the water to be treated may be used as a water quality index. Further, regarding the wastewater in general containing oxidation-reduction pollutants or inorganic/organic acid/alkali pollutants, for example, oxidation-reduction potential (ORP) of the water to be treated may be used as a water quality index.

<Aspects of the Present Invention>

1. First Aspect of the Present Invention

A first aspect of the present invention is a water treatment plant controlling method including a correlation determination step of determining whether or not there is a correlation, in the water to be treated, between a water quality index and concentration of a pollution component having no causal relationship with the water quality index, from a result of sample analysis of the water to be treated performed periodically; a first pollution component concentration estimation step of, under the condition that there is the correlation, statistically analyzing distribution of the measurement values of the water quality index in a previous certain period of the water to be treated, and based on the result of the statistical analysis and the correlation, estimating the concentration of the pollution component of the water to be treated; and an operating condition determination step of determining an operating condition of the water treatment plant for treating the water to be treated, based on the estimated concentration of the pollution component of the water to be treated.

First, from a result of sample analysis of the water to be treated performed periodically, it is determined whether or not there is a correlation between a water quality index and a concentration of pollution component having no causal relationship with the water quality index. Then, on the condition that there is a correlation between the two, statistical analysis is performed on the distribution of the measurement values of the water quality index in a previous certain period of the water to be treated, and based on the result of the statistical analysis and the correlation, concentration of the pollution component is estimated. Thereby, from a water quality index, it is possible to estimate concentration of a pollution component having no causal relationship with the water quality index with high accuracy. As such, variation in the water quality of the water to be treated can be grasped precisely without any costly measurement devices. Then, based on the estimated concentration of the pollution component, operating conditions of the water treatment plant for treating the water to be treated is determined. Thereby, the water treatment plant can be operated with the optimum operating conditions precisely corresponding to the variation in the water quality of the water to be treated.

With this configuration, according to the first aspect of the present invention, it is possible to achieve an effect of operating the water treatment plant with the optimum operating conditions precisely corresponding to the variation in the water quality of the water to be treated, without any costly measurement devices.

2. Second Aspect of the Present Invention

A second aspect of the present invention is a water treatment plant controlling method according to the first aspect of the present invention described above, wherein the first pollution component concentration estimation step includes a step of calculating a regression line and a prediction limit thereof by performing regression analysis on the result of the sample analysis of the water to be treated; calculating, by statistical analysis, an average value and a standard deviation of the distribution of the measurement values of the water quality index in the previous certain period of the water to be treated; obtaining a maximum value of the measurement values of the water quality index falling under an appearance probability set based on the average value and the standard deviation; and based on the prediction limit of the regression line and the maximum value of the measurement values of the water quality index, estimating the concentration of the pollution component of the water to be treated.

According to the second aspect of the present invention, as it is possible to estimate the concentration of the pollution component having no causal relationship with the water quality index of the water to be treated to be a maximum value (worst value) within a range of an error of estimation, the water treatment plant can be operated under the optimum operating conditions more safely.

3. Third Aspect of the Present Invention

A third aspect of the present invention is a water treatment plant controlling method according to the first or second aspect of the present invention described above, further include, in a second pollution component concentration estimation step of, on the condition that the correlation is absent, statistically analyzing distribution of concentration of the pollution component in all past sample analyses of the water to be treated, and based on the result of the statistical analysis, estimating the concentration of the pollution component of the water to be treated.

For example, when any variation occurs temporarily in the generation source or the generation process of the water to be treated, variation may occur in the component ratio of the water to be treated, by which a correlation between a water quality index and a concentration of pollution component having not causal relationship with the water quality index may not be established temporarily. In the case where a correlation is not established between a water quality index and the concentration of a pollution component having no causal relationship with the water quality index, it is difficult to estimate the concentration of the pollution component based on the water quality index.

In that case, statistical analysis is performed provisionally on the distribution of the concentration of the pollution component in all past sample analyses of the water to be treated, and based on the result of the statistical analysis, the concentration of the pollution component is estimated. This means that the concentration of the pollution component is estimated statistically based on the accumulated data of the concentration of the pollution component in the past sample analysis. As such, even if any variation occurs temporarily in the generation source or the generation process of the water to be treated, and a correlation between the water quality index and the concentration of the pollution component is not established temporarily, it is possible to continue operation of the water treatment plant safely by setting appropriate operating conditions.

4. Fourth Aspect of the Present Invention

A fourth aspect of the present invention is a water treatment plant controlling method according to the third aspect of the present invention described above, the second pollution component concentration estimation step includes a step of calculating an average value and a standard deviation of the distribution of the concentration of the pollution component in all past sample analyses of the water to be treated, obtaining a maximum value of the concentration of the pollution component falling under an appearance probability set based on the average value and the standard deviation, and estimating the concentration of the pollution component of the water to be treated to be the maximum value of the concentration.

According to the fourth aspect of the present invention, in the case where a correlation is not established between a water quality index and the concentration of a pollution component having no causal relationship with the water quality index, it is possible to estimate the concentration of the pollution component having no causal relationship with the water quality index of the water to be treated to be a maximum value (worst value) within a range of an error of estimation. As such, the water treatment plant can be operated under appropriate optimum operating conditions more safely.

5. Fifth Aspect of the Present Invention

A fifth aspect of the present invention is a water treatment plant controlling method according to any of the first to the fourth aspects of the present invention described above, the water quality index is conductivity of the water to be treated.

Variation in the concentration of an ionic component contained in the water to be treated affects the conductivity of the water to be treated. This means that there is a causal relationship between the conductivity of the water to be treated and the concentration of the ionic component. When the component ratio in the water to be treated is almost constant, a certain correlation may be established between the conductivity of the water to be treated and the concentration of a pollution component having no causal relationship with the conductivity of the water to be treated. As such, according to the fifth aspect of the present invention, it is possible to estimate the concentration of the pollution component having no causal relationship with the conductivity of the water to be treated with high accuracy from the conductivity of the water to be treated, based on such a correlation. Accordingly, it is possible to precisely grasp variation in the water quality of the water to be treated, without any costly measurement devices.

6. Sixth Aspect of the Present Invention

A sixth aspect of the present invention is a water treatment plant controlling method according to any of the first to the fourth aspects of the present invention described above, the water quality index is turbidity of the water to be treated.

Variation in the concentration of a solid component contained in the water to be treated affects the turbidity of the water to be treated. This means that there is a causal relationship between the turbidity of the water to be treated and the concentration of the solid component. When the component ratio in the water to be treated is almost constant, a certain correlation may be established between the turbidity of the water to be treated and the concentration of a pollution component having no causal relationship with the turbidity of the water to be treated. As such, according to the sixth aspect of the present invention, it is possible to estimate the concentration of the pollution component having no causal relationship with the turbidity of the water to be treated with high accuracy from the turbidity of the water to be treated, based on such a correlation. Accordingly, it is possible to precisely grasp variation in the water quality of the water to be treated, without any costly measurement devices.

7. Seventh Aspect of the Present Invention

A seventh aspect of the present invention is a water treatment plant controlling method according to any of the first to the fourth aspects of the present invention described above, the water quality index is absorbance of the water to be treated.

Variation in the concentration of organic/inorganic soluble component and solid component contained in the water to be treated affects the absorbance of the water to be treated. This means that there is a causal relationship between the absorbance of the water to be treated and the concentration of the organic/inorganic soluble component and solid component. When the component ratio in the water to be treated is almost constant, a certain correlation may be established between the absorbance of the water to be treated and the concentration of a pollution component having no causal relationship with the absorbance of the water to be treated. As such, according to the seventh aspect of the present invention, it is possible to estimate the concentration of the pollution component having no causal relationship with the absorbance of the water to be treated with high accuracy from the absorbance of the water to be treated, based on such a correlation. Accordingly, it is possible to precisely grasp variation in the water quality of the water to be treated, without any costly measurement devices.

8. Eighth Aspect of the Present Invention

An eighth aspect of the present invention is a water treatment plant controlling method according to any of the first to the fourth aspects of the present invention described above, the water quality index is potential Hydrogen of the water to be treated.

Variation in the concentration of an acid component and an alkaline component contained in the water to be treated affects the potential Hydrogen (pH) of the water to be treated. This means that there is a causal relationship between the potential Hydrogen of the water to be treated and the concentration of the acid component and the alkaline component. When the component ratio in the water to be treated is almost constant, a certain correlation may be established between the potential Hydrogen of the water to be treated and the concentration of a pollution component having no causal relationship with the potential Hydrogen of the water to be treated. As such, according to the eighth aspect of the present invention, it is possible to estimate the concentration of the pollution component having no causal relationship with the potential Hydrogen of the water to be treated with high accuracy from the potential Hydrogen of the water to be treated, based on such a correlation. Accordingly, it is possible to precisely grasp variation in the water quality of the water to be treated, without any costly measurement devices.

9. Ninth Aspect of the Present Invention

A ninth aspect of the present invention is a water treatment plant controlling method according to any of the first to the fourth aspects of the present invention described above, the water quality index is oxidation-reduction potential of the water to be treated.

Variation in the concentration of an oxidation-reduction substance contained in the water to be treated affects the oxidation-reduction potential (ORP) of the water to be treated. This means that there is a causal relationship between the oxidation-reduction potential of the water to be treated and the concentration of the oxidation-reduction substance. When the component ratio in the water to be treated is almost constant, a certain correlation may be established between the oxidation-reduction potential of the water to be treated and the concentration of a pollution component having no causal relationship with the oxidation-reduction potential of the water to be treated. As such, according to the ninth aspect of the present invention, it is possible to estimate the concentration of the pollution component having no causal relationship with the oxidation-reduction potential of the water to be treated with high accuracy from the oxidation-reduction potential of the water to be treated, based on such a correlation. Accordingly, it is possible to precisely grasp variation in the water quality of the water to be treated, without any costly measurement devices.

10. Tenth Aspect of the Present Invention

A tenth aspect of the present invention is a water treatment plant controlling program for causing a computer to perform a correlation determination procedure of determining whether or not there is a correlation, in the water to be treated, between a water quality index and concentration of a pollution component having no causal relationship with the water quality index, from a result of sample analysis of the water to be treated performed periodically; a first pollution component concentration estimation procedure of, under the condition that there is the correlation, statistically analyzing distribution of the measurement values of the water quality index in a previous certain period of the water to be treated, and based on the result of the statistical analysis and the correlation, estimating concentration of the pollution component of the water to be treated; and an operating condition determination procedure of determining an operating condition of the water treatment plant for treating the water to be treated, based on the estimated concentration of the pollution component of the water to be treated.

According to the tenth aspect of the present invention, in a water treatment plant controlled by a computer executing the control program, an effect similar to that of the first aspect of the present invention described above can be achieved.

11. Eleventh Aspect of the Present Invention

An eleventh aspect of the present invention is a water treatment plant controlling program according to the tenth aspect of the present invention described above, the program further causes the computer to perform a second pollution component concentration estimation procedure of, on the condition that the correlation is absent, statistically analyzing distribution of the concentration of the pollution component in all past sample analyses of the water to be treated, and based on the result of the statistical analysis, estimating the concentration of the pollution component of the water to be treated.

According to the eleventh aspect of the present invention, in the water treatment plant controlled by the computer executing the control program, an effect similar to that of the third aspect of the present invention described above can be achieved.

12. Twelfth Aspect of the Present Invention

A twelfth aspect of the present invention is a water treatment system characterized as to include a water treatment plant, a measurement device for measuring a water quality index of water to be treated in the water treatment plant, and a controller that controls the water treatment plant, wherein the controller includes correlation determination means for determining whether or not there is a correlation, in the water to be treated, between a water quality index and concentration of a pollution component having no causal relationship with the water quality index, from a result of sample analysis of the water to be treated performed periodically; first pollution component concentration estimation means for, under the condition that there is the correlation, statistically analyzing distribution of measurement values of the water quality index in a previous certain period of the water to be treated, and based on the result of the statistical analysis and the correlation, estimating concentration of the pollution component of the water to be treated; and operating condition determination means for determining an operating condition of the water treatment plant for treating the water to be treated, based on the estimated concentration of the pollution component of the water to be treated.

According to the twelfth aspect of the present invention, in the water treatment plant, an effect similar to that of the first aspect of the present invention described above can be achieved.

13. Thirteenth Aspect of the Present Invention

A thirteenth aspect of the present invention is a water treatment system according to the twelfth aspect of the present invention described above, further include, in second pollution component concentration estimation means for, on the condition that the correlation is absent, statistically analyzing distribution of the concentration of the pollution component in all past sample analyses of the water to be treated, and based on the result of the statistical analysis, estimating the concentration of the pollution component of the water to be treated.

According to the thirteenth aspect of the present invention, in the water treatment plant, an effect similar to that of the third aspect of the present invention described above can be achieved.

EXPLANATION OF REFERENCE SIGNS 10 water treatment apparatus
11 RO membrane separator
12 conductivity sensor
13 feed water heater
14 temperature sensor
15 high pressure pump 16 first flow sensor
17 second flow sensor
20 controller

What is claimed is:

1. A water treatment system comprising:
a water treatment apparatus within a water treatment plant;
at least one sensor for measuring values of at least one water quality index parameter of water to be treated in the water treatment plant;
a controller;
a temperature sensor for sensing the temperature of the water to be treated; and
a feed water heater for heating the water to be treated;
wherein the controller is operable for:
obtaining the measured values of at least one water quality index parameter of water to be treated in the water treatment plant;
determining a correlation coefficient between the at least one water quality index parameter of water to be treated in the water treatment plant and a periodically-determined concentration of a pollution component of the water to be treated, said concentration having potential causal relationship with the at least one water quality index parameter;
for each water quality index parameter, the controller being operable for estimating the concentration of the pollution component of the water to be treated by the measured values of the at least one water quality index parameter of the water when the determined correlation coefficient is 0.5 or larger, or, when the determined correlation coefficient is under 0.5, estimating the concentration of the pollution component of the water to be treated by statistical analysis of prior periodically-determined concentrations of the pollution component of the water to be treated whereby the concentration is estimated by:
(i) calculating a regression line and a prediction limit thereof by performing a regression analysis between (a) the measured values of the at least one water quality index parameter and (b) a result of sample analysis of the water to be treated performed periodically in a previous certain period;
(ii) calculating an average value and a standard deviation of a frequency distribution of the measured values of the at least one water quality index parameter in the previous certain period;
(iii) calculating a maximum value of the measured values of the at least one water quality index parameter based on the average value and the standard deviation; and
(iv) estimating the concentration of the pollution component of the water to be treated based on the maximum value of the measured values of the at least one water quality index parameter and the prediction limit of the regression line; and
the controller being operable for determining an operating condition of the water treatment apparatus based on the estimated concentration of the at least one pollution component to be treated such that, for each pollution component, the concentration of the pollution component in a concentrated water is maintained less than a solubility of the pollution component during a water treatment operation,
wherein the at least one water quality index parameter comprises at least one parameter selected from the group consisting of conductivity, turbidity, absorbance, potential hydrogen and oxidation-reduction potential,
wherein the operating condition of the water treatment apparatus is temperature of the water to be treated,
wherein the water treatment apparatus comprises a reverse osmosis separator,
wherein the controller controls the feed water heater based on an output signal from the temperature sensor such that the temperature of the water to be treated is supplied to the reverse osmosis separator at the determined temperature,
wherein the controller is connected to the temperature sensor such that the output signal is transmitted from the temperature sensor to the controller, and
wherein the controller is connected to the feed water heater which is connected to the reverse osmosis membrane separator to control the temperature supplied to the reverse osmosis membrane separator.

2. The water treatment system according to claim 1, wherein, for each water quality index parameter, a maximum value of the measured values of the at least one water quality index parameter falls within a probability that all of the measured values of the at least one water quality index parameter are included in a range where a deviation from the average value is two times the standard deviation.

3. A water treatment system comprising:
a water treatment apparatus within a water treatment plant;
at least one sensor for measuring values of at least one water quality index parameter of water to be treated in the water treatment plant;
a reverse osmosis separator with a permeate line and a concentrate line
a controller;
a first flow sensor for sensing the flow of water in the permeate line and a second flow sensor for sensing the flow of water in the concentrate line; and
a high pressure pump
wherein the controller is operable for:
obtaining the measured values of at least one water quality index parameter of water to be treated in the water treatment plant;
determining a correlation coefficient between the at least one water quality index parameter of water to be treated in the water treatment plant and a periodically-determined concentration of a pollution component of the water to be treated, said concentration having potential causal relationship with the at least one water quality index parameter;
for each water quality index parameter, the controller being operable for estimating the concentration of the pollution component of the water to be treated by the measured values of the at least one water quality index parameter of the water when the determined correlation coefficient is 0.5 or larger, or, when the determined correlation coefficient is under 0.5, estimating the concentration of the pollution component of the water to be treated by statistical analysis of prior periodically-determined concentrations of the pollution component of the water to be treated whereby the concentration is estimated by:
(i) calculating a regression line and a prediction limit thereof by performing a regression analysis between (a) the measured values of the at least one water quality index parameter and (b) a result of sample analysis of the water to be treated performed periodically in a previous certain period;

(ii) calculating an average value and a standard deviation of a frequency distribution of the measured values of the at least one water quality index parameter in the previous certain period;

(iii) calculating a maximum value of the measured values of the at least one water quality index parameter based on the average value and the standard deviation; and (iv) estimating the concentration of the pollution component of the water to be treated based on the maximum value of the measured values of the at least one water quality index parameter and the prediction limit of the regression line; and the controller being operable for determining an operating condition of the water treatment apparatus based on the estimated concentration of the at least one pollution component to be treated such that, for each pollution component, the concentration of the pollution component in a concentrated water is maintained less than a solubility of the pollution component during a water treatment operation, wherein the at least one water quality index parameter comprises at least one parameter selected from the group consisting of conductivity, turbidity, absorbance, potential hydrogen and oxidation-reduction potential, wherein the operating condition of the water treatment apparatus is a determined water recovery ratio of the reverse osmosis separator, and wherein the controller controls the high pressure pump based on output signals from a first flow sensor and second flow sensor such that the reverse osmosis separator is operated at the determined water recovery ratio, wherein the controller is connected to the first flow sensor and second flow sensor such that the output signals are transmitted from the first flow sensor and second flow sensor to the controller, and wherein the controller is connected to the high pressure pump connected to the reverse osmosis membrane separator to control the water recovery ratio of the reverse osmosis membrane separator.

4. The water treatment system according to claim 3, wherein, for each water quality index parameter, a maximum value of the measured values of the at least one water quality index parameter falls within a probability that all of the measured values of the at least one water quality index parameter are included in a range where a deviation from the average value is two times the standard deviation.

5. A water treatment system comprising:
a water treatment apparatus within a water treatment plant;
at least one sensor for measuring values of at least one water quality index parameter of water to be treated in the water treatment plant;
a temperature sensor for sensing the temperature of the water to be treated and
a controller;
wherein the at least one water quality index parameter comprises conductivity;
wherein the at least one sensor comprises a conductivity sensor for sensing the conductivity of the water to be treated;
wherein the controller is operable for:
obtaining the measured values of at least one water quality index parameter of water to be treated in the water treatment plant;
determining a correlation coefficient between the at least one water quality index parameter of water to be treated in the water treatment plant and a periodically-determined concentration of a pollution component of the water to be treated, said concentration having potential causal relationship with the at least one water quality index parameter;

for each water quality index parameter, the controller being operable for estimating the concentration of the pollution component of the water to be treated by the measured values of the at least one water quality index parameter of the water when the determined correlation coefficient is 0.5 or larger, or, when the determined correlation coefficient is under 0.5, estimating the concentration of the pollution component of the water to be treated by statistical analysis of prior periodically-determined concentrations of the pollution component of the water to be treated whereby the concentration is estimated by:

(i) calculating a regression line and a prediction limit thereof by performing a regression analysis between (a) the measured values of the at least one water quality index parameter and (b) a result of sample analysis of the water to be treated performed periodically in a previous certain period;

(ii) calculating an average value and a standard deviation of a frequency distribution of the measured values of the at least one water quality index parameter in the previous certain period;

(iii) calculating a maximum value of the measured values of the at least one water quality index parameter based on the average value and the standard deviation; and (iv) estimating the concentration of the pollution component of the water to be treated based on the maximum value of the measured values of the at least one water quality index parameter and the prediction limit of the regression line; and the controller being operable for determining an operating condition of the water treatment apparatus based on the estimated concentration of the at least one pollution component to be treated such that, for each pollution component, the concentration of the pollution component in a concentrated water is maintained less than a solubility of the pollution component during a water treatment operation, wherein the water treatment apparatus comprises a reverse osmosis separator, wherein the controller is connected to the reverse osmosis separator, and sets a temperature of the water to be treated to be supplied to the reverse osmosis separator, wherein the controller is connected to the conductivity sensor such that the output signal is transmitted from the conductivity sensor to the controller and wherein the controller is connected to the reverse osmosis separator, and sets a water recovery ratio of the reverse osmosis separator based on conductivity values of the water to be treated sensed by the at least one sensor connected to the controller.

6. The water treatment system according to claim 5, wherein the conductivity values of the water to be treated are detected by the at least one water quality index sensor repeatedly at a constant frequency, and further comprising a storage device for storing the detected conductivity values are stored in a storage device.

7. The water treatment system according to claim 5, wherein, for each water quality index parameter, a maximum value of the measured values of the at least one water quality index parameter falls within a probability that all of the measured values of the at least one water quality index parameter are included in a range where a deviation from the average value is two times the standard deviation.

8. The water treatment system according to claim 7, wherein the conductivity values of the water to be treated are detected by the at least one water quality index sensor repeatedly at a constant frequency, and further comprising a storage device for storing the detected conductivity values are stored in a storage device.

\* \* \* \* \*